W. B. YODER.
ANTISKIDDING TIRE.
APPLICATION FILED AUG. 12, 1909.
976,971.
Patented Nov. 29, 1910.
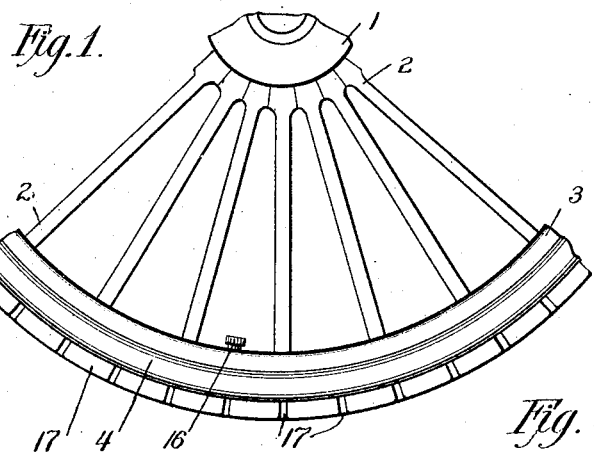
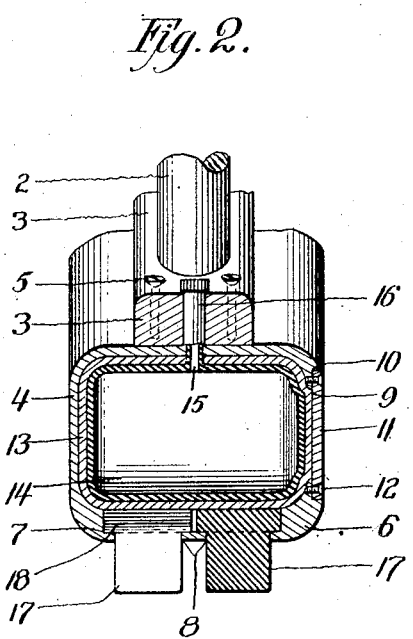
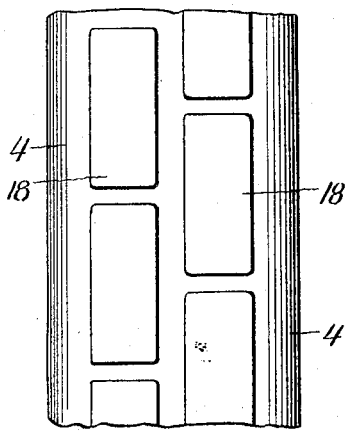
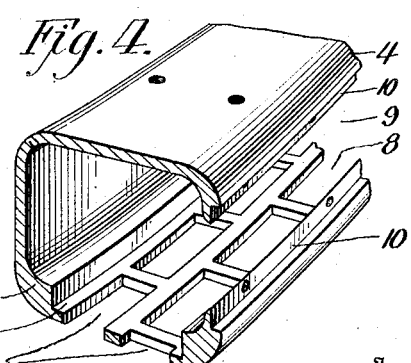
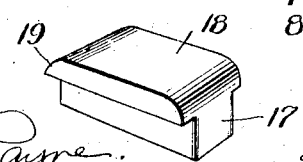
Witnesses
Samuel Payne
O. H. Butler
Inventor
W. B. Yoder,
By N. E. Everett Co.
Attorneys

UNITED STATES PATENT OFFICE.

WILLIAM B. YODER, OF PITTSBURG, PENNSYLVANIA.

ANTISKIDDING TIRE.

976,971. Specification of Letters Patent. Patented Nov. 29, 1910.

Application filed August 12, 1909. Serial No. 512,491.

*To all whom it may concern:*

Be it known that I, WILLIAM B. YODER, a citizen of the United States of America, residing at Pittsburg, in the county of Allegheny and State of Pennsylvania, have invented certain new and useful Improvements in Antiskidding Tires, of which the following is a specification, reference being had therein to the accompanying drawing.

This invention relates to anti-skidding treads for the periphery of wheels and more particularly to that class of treads used in connection with the wheels of automobiles, motor-cycles and similar vehicles and has for its object to provide a tread in a manner as hereinafter set forth which will reduce to a minimum vehicles from skidding or sliding on wet, muddy, or irregular roads, and at the same time prevent the tires of the vehicles from being punctured or penetrated by glass, stones or other irregularities in a road, whereby the inconvenience and expense incurred by tire punctures and repairs will be overcome.

The invention will be hereinafter considered in detail and then claimed, and reference will now be had to the drawings forming a part of this specification, wherein there are illustrated the preferred embodiments of my invention, but it must be understood that the structural elements thereof can be varied or changed, as to the size, shape, and manner of assemblage without departing from the scope of the invention as claimed.

In the drawings:—Figure 1 is a side elevation of a wheel provided with my improved tire or tread, Fig. 2 is an enlarged vertical sectional view of the tire or tread, Fig. 3 is a plan of a portion of the tire or tread, Fig. 4 is a perspective view of a portion of the casing forming the rim of the wheel, and Fig. 5 is a perspective view of a detached tread piece.

In the drawings 1 denotes the hub of a wheel provided with radially disposed spokes 2 having the outer ends thereof connected by a felly 3, these parts being common to the ordinary and well known type of wheel.

4 denotes a metallic casing arranged circumferentially of the felly 3 and forming the rim of the wheel. The casing 4 is rectangular in cross section with the edges thereof rounded or curved, and as one form of a means for securing the casing or rim to the felly 3, screw bolts 5 may be employed, which extend through the felly and engage in the casing or rim 4, but any suitable fastening means for such purpose may be employed. That portion of the rim or casing forming the periphery of the wheel is thickened or reinforced, as at 6 to add strength and rigidity to the rim or casing. The reinforced portion 6 has the inner side thereof provided with a circumferentially arranged groove or seat 7, and with parallel rows of circumferentially disposed oblong openings 8, the openings of one row being staggered with relation to the openings of the other row. This construction is best shown in Fig. 4 of the drawings, where it will be observed that the reinforced portion of the rim or casing presents a skeleton frame work adapted to support inserts or tread pieces, which will be presently described in detail. The outer side of the rim or casing 4 is provided with an annular opening 9 to permit of easy access being had to the interior of the rim or casing. The circumferential edges of the opening 9 are chamfered or grooved to provide a seat 10 for an annular plate 11 detachably held in the seat 10 by screws 12 or similar fastening means.

13 denotes a circumferentially arranged yieldable sheath or outer tube, which is placed in the rim or casing 4 through the opening 9 and is rectangular in cross section to conform to the cross sectional area of the rim or casing 4. This yieldable shield is made of leather or other flexible material. Sole leather is preferably used and arranged with its grained surface inward, for a purpose that will hereinafter appear. The sheath can be made of a single piece of leather and the longitudinal edges thereof laced or otherwise connected, or the edges can be arranged to abut without fastening means.

14 denotes an air tube or pneumatic cushion arranged circumferentially within the sheath 13. This air tube is also rectangular in cross section, and in order that said tube can be inflated for the purpose that it is intended, the said tube is provided with a neck 15 extending through openings provided therefor in the sheath 13 and the rim or casing 4, said neck communicating with a filling or valve tube 16 arranged at a convenient place in the felly 3. The grained surface of the leather sheath 13 is susceptible to high polish, so that it constitutes practically an anti-frictional surface, obviating the liability of chafing the air tube 14, which is preferably made of rubber.

17 denotes tread blocks or pieces adapted to be mounted in the reinforced portion 6 of the rim or casing 4 and protrude through the openings 8. The tread blocks or pieces 17 are made of rubber sufficiently hardened to withstand considerable wear and tear, yet having sufficient elasticity to assist in cushioning the rim or casing 4. The tread blocks or pieces 17 fill the openings 8 and have the inner sides thereof provided with heads 18 adapted to engage in the seat 7 and prevent the tread blocks or pieces from becoming accidentally displaced. The ends of the heads 18 are grooved or rounded, as at 19 to prevent the heads from injuring or rupturing the sheath 13 against which said heads bear, also to prevent the confronting ends of the heads 18 from buckling when contacting with one another.

It is apparent from the foregoing that the air tube is protected from "blow-outs" and punctures, and that the tread blocks or pieces are renewable and can be easily and quickly installed. To renew the tread blocks or pieces in connection with the construction shown in Figs. 1 to 4 inclusive, it is necessary that the air be expelled from the tube 14 and plate 11 removed.

Having now described my invention, what I claim as new, is:—

1. A wheel tire comprising the combination with the felly of a wheel, of a casing having its inner wall mounted against and secured to the felly and its outer wall grooved on its inner face and further provided with two rows of circumferentially-arranged openings, the openings of one row being staggered with respect to the openings of the other row, resilient tread blocks seated in said groove and against the inner face of the outer wall of the casing and projecting through said openings, a yieldable sheath mounted in said casing and engaging the inner ends of said blocks, an inflatable air tube arranged within said sheath and adapted to retain the sheath in engagement with the tread blocks, said casing having one side provided with an annular opening whereby access can be had to the interior thereof, and an annular plate secured to the casing for closing said annular opening.

2. A wheel tire comprising a casing mounted upon the felly of the wheel and having the inner face of the tread side thereof formed with a circumferentially-extending groove and further having said tread side formed with two rows of circumferentially-disposed openings, the openings of one row being staggered with respect to the openings of the other row, resilient tread blocks provided with heads, said heads mounted in the groove and said blocks extending through said openings, a yieldable sheath mounted in said casing and engaging the heads of said blocks, and an inflatable air tube mounted within said sheath and retaining the latter in engagement with the heads of the tread blocks.

3. A wheel tire comprising a casing mounted upon the felly of the wheel and having the inner face of the tread side thereof formed with a circumferentially-extending groove and further having said tread side formed with two rows of circumferentially-disposed openings, resilient tread blocks provided with heads, said heads mounted in the said groove and said blocks extending through said openings, a yieldable sheath mounted in said casing and engaging the heads of said blocks, an inflatable air tube mounted within said sheath and retaining the latter in engagement with the heads of the tread blocks, said casing having one side provided with an annular opening, and an annular plate secured to the casing for closing said opening.

4. A wheel tire comprising a casing mounted upon the felly of the wheel and having the inner face of the tread side thereof formed with a circumferentially-extending groove and further having said tread side formed with two rows of circumferentially-disposed openings, the openings of one row being staggered with respect to the openings of the other row, resilient tread blocks provided with heads, said heads mounted in the groove and said blocks extending through said openings, a yieldable sheath mounted in said casing and engaging the heads of said blocks, an inflatable air tube mounted within said sheath and retaining the latter in engagement with the heads of the tread blocks, said casing having one side provided with an annular opening, and an annular plate secured to the casing for closing said opening.

5. A wheel tire comprising an annular casing substantially rectangular in cross section and having one side thereof open, said casing having the inner face of the outer wall thereof cut away to provide a circumferentially-extending groove and said outer wall further having a circumferentially-extending row of rectangular openings, resilient tread blocks provided with rectangular heads, said heads mounted in said groove and said blocks extending through said openings, means for closing the open side of said casing, a yieldable sheath mounted in said casing and engaging said heads, and an inflatable air tube mounted within said sheath and retaining the latter in engagement with said heads.

In testimony whereof I affix my signature in the presence of two witnesses.

WILLIAM B. YODER.

Witnesses:
MAX H. SROLOVITZ,
A. T. PAYNE.